United States Patent [19]

Rorden et al.

[11] Patent Number: 4,587,741

[45] Date of Patent: May 13, 1986

[54] BALL INCLINOMETER

[75] Inventors: Louis H. Rorden, Los Altos; Edward C. Fraser, Cupertino, both of Calif.

[73] Assignee: Develco, Inc., Sunnyvale, Calif.

[21] Appl. No.: 536,556

[22] Filed: Sep. 27, 1983

[51] Int. Cl.$^4$ .................................................. G01C 9/06
[52] U.S. Cl. ................................. 33/366; 73/516 LM
[58] Field of Search ............ 33/366, 377; 73/516 LM, 73/516

[56] References Cited

U.S. PATENT DOCUMENTS

| | | | |
|---|---|---|---|
| 2,492,794 | 12/1949 | Goble et al. | 250/2 |
| 2,635,349 | 4/1953 | Green | 33/205.5 |
| 2,825,978 | 3/1958 | Davis | 33/206 |
| 2,893,134 | 7/1959 | Shea et al. | 33/366 |
| 3,164,023 | 1/1965 | Holderer | 73/516 |
| 3,584,387 | 6/1971 | Sturn | 33/206 |
| 3,791,042 | 2/1974 | Bell | 33/304 |
| 3,823,486 | 7/1974 | Bhat et al. | 33/366 |
| 3,906,471 | 9/1975 | Shawhan | 340/200 |
| 3,984,918 | 10/1976 | Chaney | 33/366 |
| 4,167,818 | 9/1979 | Cantarella et al. | 33/366 |

FOREIGN PATENT DOCUMENTS

| | | | |
|---|---|---|---|
| 849488 | 7/1949 | Fed. Rep. of Germany | |
| 2399642 | 4/1979 | France | 33/366 |
| 55-122110 | 4/1980 | Japan | |
| 7703523 | 10/1978 | Netherlands | 33/366 |
| 159356 | 4/1957 | Sweden | |
| 682761 | 1/1950 | U.S.S.R. | |

Primary Examiner—Willis Little
Attorney, Agent, or Firm—C. Michael Zimmerman

[57] ABSTRACT

An inclinometer includes a toroidal race containing a spherical ball free to move therein under the influence of gravity. Signal source and collector electrode assemblies are provided on opposite sides of the toroidal race, and the ball functions to capacitively couple signals on the source electrode to the collector electrode. In one embodiment the source electrode is shaped so that the amplitude of coupling varies with ball position in the race so that the signal on the collector electrode is indicative of ball position. In other embodiments the source electrode is continuous and symmetrical, and signals applied thereto are selected such that a property of the signal coupled to the collector electrode, such as signal phase, varies in accordance with ball position in the race. Three such inclinometers can be combined in a borehold sensor for drilling applications.

26 Claims, 14 Drawing Figures

SUBPERIODS

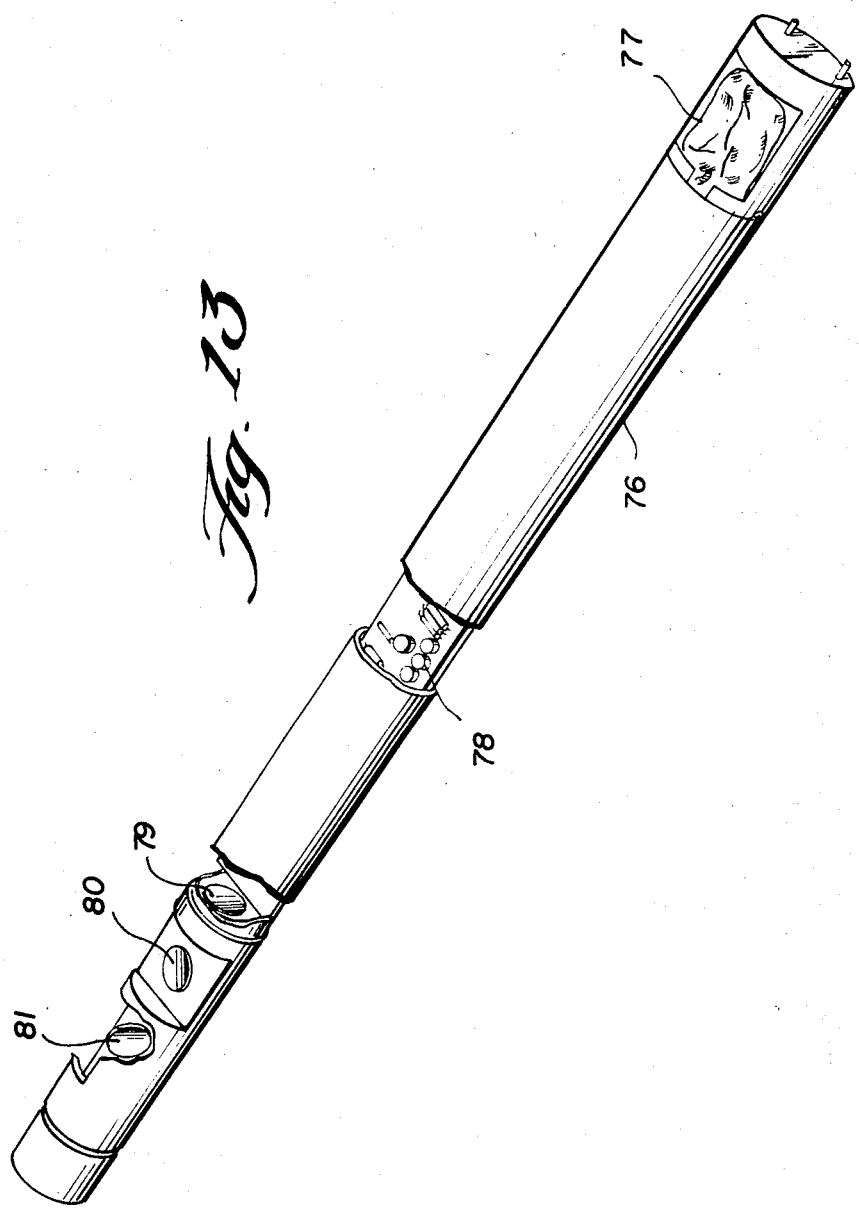

BALL INCLINOMETER

BACKGROUND OF THE INVENTION

This invention pertains to sensing the direction of the gravity vector in the vicinity of the inclinometer. More particularly, the invention pertains to measurement of inclination with respect to vertical, particularly as applied for directional determination during well drilling The prior art, particularly in connection with directional determination during well drilling, has involved the use of accelerometers. These accelerometers as previously used for borehole inclination measurement are fragile, expensive, temperature sensitive and large. In accordance with the present invention, a very rugged, low-cost, temperature-insensitive, low-power, non-magnetic miniature inclinometer is provided for use in such applications and otherwise.

The basic physical principle employed in an inclinometer to sense the position of the gravity vector is that a mass not otherwise constrained will always come to rest in a condition of minimum potential energy. In the case of a mass constrained to remain within a fixed volume, it will move to occupy the lowest point in the volume. This is illustrated by the plumb bob, which is constrained to remain within a sphere whose radius is defined by the length of its supporting line, but will always come to rest with the bob directly below the point of suspension: the lowest point in the sphere of possible points. The direction of the gravity vector in the vicinity of the mass is defined as the normal to the constraining surface at the point where the mass contacts the surface. Again, for the plumb bob example, the constraining surface is a sphere, and the gravity direction is the normal to the sphere at its lowest point. Since all normals to a sphere are also radii of the sphere and therefore pass through its center, the sensed direction of the gravity vector is coincidental with the plumb bob support line—a well known practical fact.

Many examples exist in the prior art of using a constrained mass for purposes of sensing gravity, notable among which are the curved vial and ball of an aircraft bank indicator, and the floating bubble of a carpenter's level. For both the aircraft bank indicator and the carpenter's level, the readout is optical; that is, one visually determines the inclination based on the position of the ball or bubble with respect to index markings. Also, neither of these prior art devices is adapted to provide proper indications of inclination over a full range of 360° movement.

The prior art has recognized the desirability of providing an inclinometer arrangement in which an electrical, as opposed to visual, readout is provided. One such general type of prior art arrangement involves parallel resistive tracks on which a spherical ball rolls. Such arrangements demand at least two points of contact between the parallel tracks and ball and complete a circuit of some sort through the ball whereby the ball position is indicated by means of a voltage drop or the like. These devices tend to be relatively insensitive in that friction is substantial due to the necessity of two points of contact between the ball and track. Furthermore, unless the ball is constrained in some manner, the device will not operate over 360° because the ball will fall off when the tracks are inverted. If the ball is constrained between two diametrically opposed tracks, then presumably it could be tilted over. However, what would result is a relatively insensitive device because of the greatly increased friction to which the ball would be subjected.

Another type of prior art arrangement utilizes a capacitive coupling. Typically, there is an assembly including stationary plates and a movable element on a cantilevered arm. As the assembly is rotated, the force of gravity tends to rotate the movable element so as to change the effective capacitance. The capacitance is measured in a balanced bridge or the like and is used for calculating the magnitude or direction of the force of gravity.

None of these prior art arrangements as discussed above function well in hostile environments, such as temperature extremes and shock and vibration.

OBJECTS AND SUMMARY OF THE INVENTION

It is an object of the present invention to sense the direction of the gravity vector in the vicinity of the inclinometer and particularly to sense the direction of the component of the gravity vector in the plane of the inclinometer A more detailed objective of the present invention is to provide an electrical output signal from the inclinometer that is related to the sensed direction of the gravity vector, which electrical output signal can be used for determining the inclinometer output.

An additional objective of the present invention is to provide an inclinometer that will function properly and retain its accuracy even when subjected to, in either the operating or nonoperating states, any combination of wide temperature variations, severe shocks, and extensive vibrations, and will provide inclination measurements over a full 360°.

Briefly, in accordance with one embodiment of the invention, a spherical mass is constrained inside a closely fitting toroid. The ball and toroid are of circular cross section, with the ball of smaller radius than the toroid, so that there is only one point of contact between the mass and the toroid, this being the lowest point on the toroid surface. By detecting the position of the mass within the toroid the projection of the gravity vector in the plane of the toroid is defined. Non-contacting source and collector electrodes are provided positioned opposite from each other on either side of the toroid.

Signals are applied to the source electrodes with the ball functioning to capacitively couple the signals to the collector electrode. The signals and/or source electrodes are configured such that a spatial variation in signal exists around the source electrode, so that the signals capacitively coupled to the collector electrode are uniquely indicative of ball position. The output of the collector electrode defines the position of the spherical mass or ball inside the toroid, and thus defines the gravity vector in the plane of the toroid.

Other objects and advantages of the present invention will appear from the detailed description of preferred embodiments thereof, taken in conjunction with the accompanying drawings

BRIEF DESCRIPTION OF THE DRAWINGS

FIG. 13 is a view, partially broken away of a borehole tool assembly incorporating three inclinometers in accordance with the present invention.

DETAILED DESCRIPTION OF THE PREFERRED EMBODIMENTS

Figure 1:
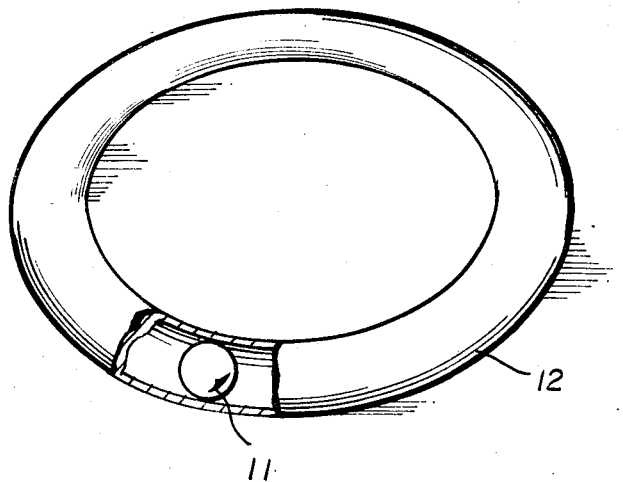
FIG. 1 is an illustration, partly broken away, of a spherical ball constrained within a toroid in accordance with the basic principle of this invention.

Turning now to FIG. 1, the basic principle of the present invention is illustrated, wherein a spherical mass or ball 11 is constrained within a closely fitting toroid 12. In accordance with the present invention, both the ball and the toroid are of circular cross section, with the ball of smaller radius than the toroid. Therefore, there will be only one point of contact between the ball and the toroid, this being the lowest point on the toroid surface. If the toroid is disposed in a vertical plane, then the gravity vector will also be in this plane and the point of contact will lie along the outer circumference of the toroid. Because the circumference is a circle, all its normals are radii. Hence the direction of the gravity vector is defined by the point of contact of the ball with the toroid, and the center of the toroid.

If the plane of the toroid is inclined with respect to the vertical, the ball will still move to the lowest point in the toroid. In this case, however, the point of contact will no longer be on the outer circumference of the toroid but will move inward along a circle defined by the toroid cross section and which lies in the plane defined by the gravity vector and the line joining the toroid center to the point of contact. The angular displacement of the point of contact along this circle is exactly equal to the inclination of the toroid plane from the vertical. It can be shown, however, that the projection into the toroid plane of the line joining the toroid center to the point of contact and the projection of the gravity vector into the toroid plane are colinear. Therefore, sensing the angular position of the ball within the toroid, by detecting by some means its point of contact, is sufficient to define the position of the projection of the gravity vector in the plane of toroid. The only exception occurs when the toroid plane is inclined by 90° with respect to the vertical, i.e., it is level. In this case the gravity vector has no projection in the plane of the toroid as evidenced by there being no "lowest" point. Under these circumstances the ball will come to rest in an arbitrary location, and its position will contain no information regarding the direction of gravity.

A circular shape for the cross section of the toroid is the only shape that provides a one-to-one correspondence between the position of the ball and the gravitational direction, and therefore achieves a uniform sensitivity over a full 360°. Other channel shapes could be used but will result in varying sensitivity over a full 360° of rotation. Therefore, in accordance with the present invention, a preferred embodiment is a circular cross sectional shape for the toroid, although the invention is not necessarily limited thereto.

Also, a sphere contained within the toroid is the only combination of shapes that produces a single point contact between the two elements regardless of the device orientation. A single point contact is most desirable in that it minimizes the friction mechanisms that would impede motion of the ball. Any residual static friction between the sphere and the toroid will set a lower limit on the angular sensitivity of the inclinometer.

Figure 2:
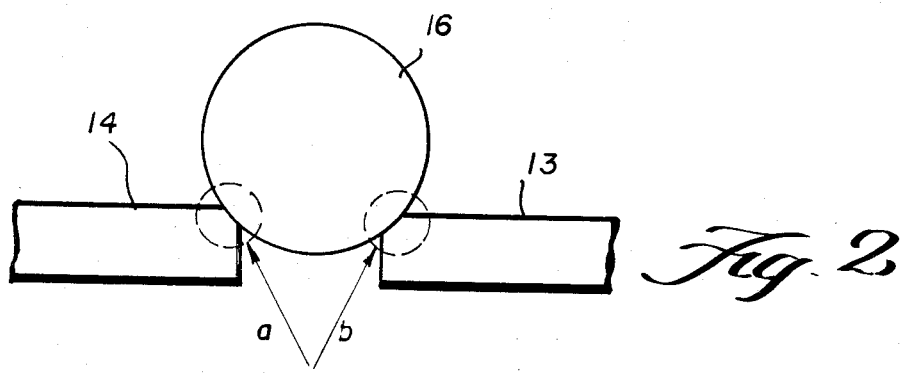
FIG. 2 is a diagrammatic illustration of one possible way to ohmically provide electrical contact between a spherical ball and electrodes
Figure 3:
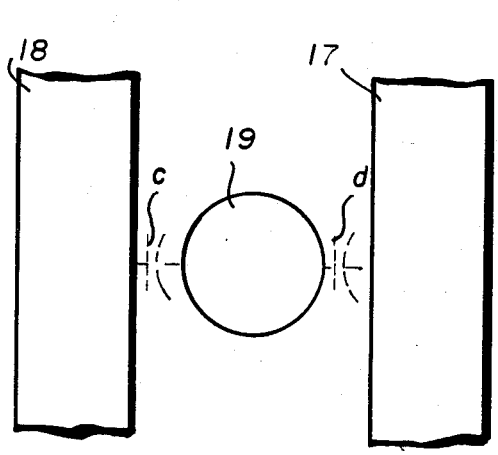
FIG. 3 is a diagrammatic illustration of capacitive coupling between a spherical ball and electrodes in accordance with the present invention.

Once the ball 11 has come to rest within the toroid 12, it is then necessary to derive an electrical signal representative of its position, and thereby to determine the position of the projection of gravity in the plane of the inclinometer. The basic principle employed in accordance with the present invention is to utilize the ball as a coupling mechanism between one electrode, or set of electrodes, that generate a signal, some characteristic of which varies with position around the toroid; and a second electrode that collects the signal and delivers it to the subsequent signal processing and analysis circuits. In the preferred embodiment the ball is an electrical conductor, but it could also be an insulator with either a higher or lower dielectric constant than the surrounding medium, the fluid that fills the remainder of the torus. FIGS. 2 and 3 illustrate two possible coupling techniques that could be employed. In FIG. 2 a source electrode 13 and collector electrode 14 could be provided in such a position with respect to one another that a ball or sphere 16 makes physical contact with both the source and collector electrodes. This does provide an angle dependent conductive path between the two; however two points of ohmic contact a and b are required. Not only does this greatly increase the friction of the ball within the constraining volume, but it also subjects the device to performance degradation when placed in a hostile environment. For example, in an environment wherein there was considerable vibration, with the ball vibrating within its constraining volume, the output signal from the collector electrode, depending as it does on the ohmic contacts a and b, would not be reliable.

FIG. 3 illustrates another coupling technique that can be employed, and is in fact the one that is employed in accordance with the present invention. This is a capacitive coupling technique wherein a source electrode 17 and a collector electrode 18 are provided. A conductive ball 19, not necessarily in contact with either of the electrodes, serves as the common plate for two series capacitors c and d that couple the source electrode 17 to the collector electrode 18.

As mentioned above, in accordance with the present invention a toroid of circular cross section is utilized to constrain a conducting ball of spherical shape, and source and collector electrodes are provided capacitively coupled by the ball to one another. The source electrode employed for generating the signal, and the collector electrode for detecting the signal coupled by the conducting ball, can be disposed about the toroid in any convenient fashion. As an example, the electrodes can be deposited on diametrically opposed walls of the toroid. In this case the electrodes will be essentially tangent to the ball at the point of contact between the ball and toroid or the point of closest approach. As another example, the electrodes can be deposited on a parting plane that separates the toroid into two symmetrical halves. In this case the electrodes will be perpendicular to the surface of the ball.

The signal transferred from the source to the collector electrodes will be maximized by maximizing the capacitance between the ball and each electrode. This can be accomplished by configuring the electrodes so that they are maximally congruent with the ball's surface, this being the arrangement discussed above wherein the electrodes are essentially tangent to the ball at the point of contact or closest approach. Also, in order to maximize the capacitance, the spacing between the electrode and the ball should be minimized. Since the capacitive coupling technique in accordance with the present invention does not require actual contact of the ball with either electrode, the electrodes can be covered with a thin dielectric coating to protect them from abrasion and/or impact damage arising from the motion of the ball within the toroid.

The configuration and excitation of the electrodes is central to the operation of the inclinometer in accordance with the present invention. The only requirements on the collector electrode are that it be shaped and disposed relative to the source electrode such that it maintains constant coupling to the ball regardless of the ball's position within the toroid, minimum coupling in the absence of the ball, and that its resistance (as measured across the diameter) be very small relative to the capacitive reactance of the ball/electrode coupling capacitance. These requirements can be met, for example, by a simple conductive electrode in the shape of a circular disc or annular plate located concentric with the toroid and in a parting plane.

The requirement on the source electrode is that it must generate a signal coupled to the ball, some property of which varies uniquely with the position of the ball in the toroid. Because capacitive coupling is employed the excitation signal must be periodic; a steady state or dc signal will not produce a continuously detectable output from the collector electrode. However, any of a wide variety of periodic signals can be used, some wave forms exhibiting particularly desirable features in terms of subsequent signal processing and data extraction. Several possibilities exist for generating the required spatial variation of the signal.

Figure 4:
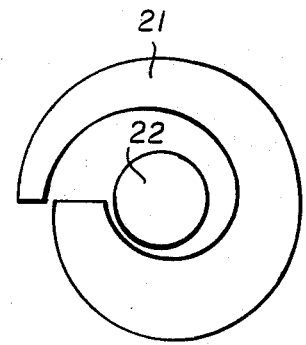
FIG. 4 is an illustration of shaped electrodes, the capacitive coupling between which varies as a function of position.

One possibility for generating a spatially varying signal which depends upon ball position in the toroid is to shape the source electrode such that the coupling capacitance varies as a function of position, so that therefore the amplitude of the coupled signal would vary with position. This is schematically illustrated in FIG. 4 showing a possible arrangement between a source electrode 21 and a collector electrode 22. The source electrode 21 is shaped such that the spacing between the two electrodes, and hence the capacitive coupling therebetween, varies as a function of position around the 360°.

Another possibility for generating the required spatial variation of the signal is to employ two or more electrodes, each excited by a distinct waveform (unique frequency, phase, etc.) and whose shape varies the coupling of each of these signals to the ball as a function of ball position.

Still another possibility for achieving the required spatial variation of the signal is to employ a single semiconducting or resistive source electrode excited at several points around its circumference by distinct signals. The potential distribution along the length of the resistive electrode between excitation points provides the required spatial variation.

As pointed out above, any periodic signal can be used to excite the source electrode. However, signals exhibiting particular characteristics make the subsequent data reduction very simple and relatively immune to variation of parameters such as supply voltage, overall coupling capacitance, electrode resistance, and the like.

Figure 5:
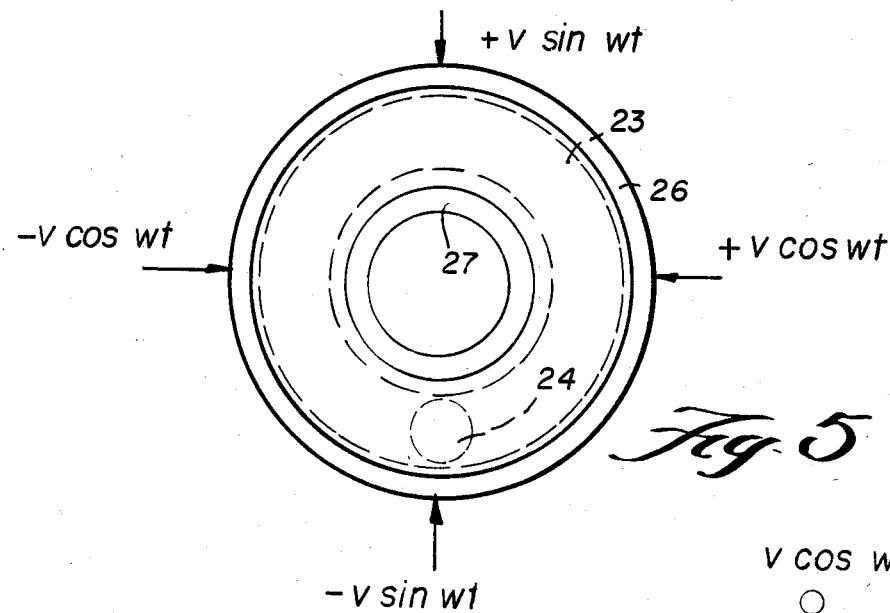
FIG. 5 is a diagrammatic illustration of one embodiment of the invention in which quadrature sinusoidal signals are applied to a single resistive source electrode.

FIG. 5 illustrates one embodiment wherein a toroid 23 with spherical ball 24 constrained therein has a single resistive source electrode 26 and a collector electrode 27. The source electrode has two periodic signals in time quadrature applied to perpendicular diameters of the source electrode as shown in FIG. 5. The fraction of each signal coupled to the ball 24 at each position of the ball is determined by the shape and/or the resistance profile of the source electrode. Since the relative coupling varies with the ball position, so will the shape of the resulting sum waveform coupled to the collector electrode. For example, if the two quadrature sinusoids as illustrated in FIG. 5 are applied to a uniform resistive source electrode 26, then the waveform coupled to the collector electrode will also be sinusoidal, but with a phase that varies with ball position according to the following relationship.

$$\tan \phi = \frac{-\theta}{90 - \theta} \qquad (1)$$

where
$\phi$ = sinusoid phase angle
$\theta$ = ball position in degrees

An output signal whose phase indicates the ball position, such as results from the arrangement of FIG. 5, is desirable since the process of phase detection is independent of signal amplitude variations or any parameter variations that would effect signal amplitude.

Sinusoidal excitation such as shown in FIG. 5 results in a simple, sinusoidal output signal; however, the phase of this signal is not linearly related to ball position. To linearize the relationship either the above equation 1 must be solved for $\theta$ for each measured value of $\phi$, or the electrodes must be shaped such that the resulting relationship is linear (equation 1 holds for a uniform resistive electrode).

Figure 6:
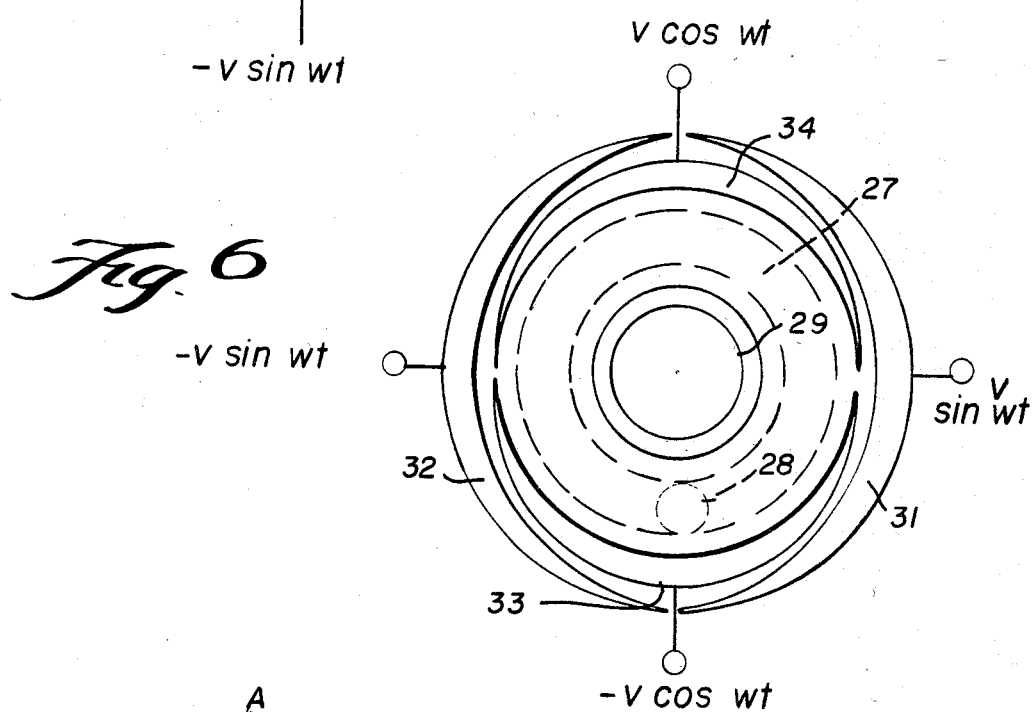
FIG. 6 is a diagrammatic illustration of another embodiment of the invention in which quadrature sinusoidal signals are applied to a plurality of shaped, interdigitated source electrodes.

FIG. 6 illustrates a possible arrangement in which a plurality of shaped, interdigitated source electrodes are utilized to linearize the relationship. Thus, in FIG. 6 a toroid 27 has a ball 28 inside the race thereof as before. A symmetrical, one-piece collector electrode 29 is provided around the inner circumference of the toroid 27. A plurality of shaped electrodes which are interdigitated with one another as shown in FIG. 6, and are indicated by reference numerals 31, 32, 33 and 34 are provided as source electrodes. The shaping of the electrodes 31 through 34 utilized as a source electrode is such as to linearize the resulting phase relationship as a linear function of the ball position. As before, two periodic signals in time quadrature are applied to the perpendicular diameters of the assembly, with one of these signals being applied to individual ones of the electrodes 31 through 34.

Shaped, interdigitated electrodes for the source electrode are difficult to produce as a practical matter such that the variation in phase of the coupled signal is linearly dependent upon the ball position. It has been found that uniformly shaped resistive electrodes can be utilized, and the excitation waveform modified so as to produce a linear phase relationship between the coupled signal and the ball position. For example, it has been determined that excitation of a uniform resistive source electrode by two quadrature triangle waves, applied at perpendicular diameters of the source electrode, results in an output waveform which is not triangular, but which has the time of occurrence of its zero crossings (one way of measuring signal phase) linearly related to the position of the ball within the toroid. Furthermore, since linear operations (integration, differentiation, addition, etc.) can be performed in any order with the same result, there exists a whole family of excitation waveforms which satisfy the requirement of phase linearity with the ball position, when the appropriate linear operation is performed on the output signal. For example, a simple squarewave drive can be used, as in FIG. 8A, and the output waveform integrated, resulting in a shape identical to the sum of triangle waves described above, and exhibiting the same linearity of zero-crossing time with ball position.

Therefore, as described above, a linear relationship between ball position and output signal phase can be obtained either using sinusoidal excitation and appropriately shaped electrodes, or via uniform electrodes and properly chosen excitation waveforms. While a linear relationship is most desirable, any small and repeatable departures from linearity can always be corrected in subsequent data processing after the original measurement is made.

Figure 7:
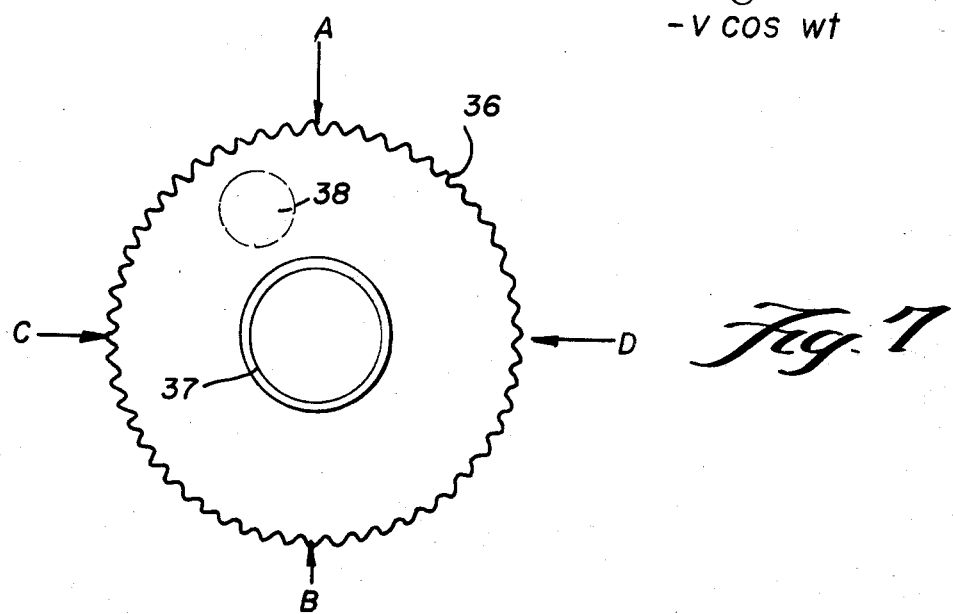
FIG. 7 is a diagrammatic illustration of another embodiment of the invention in which quadrature square waves are applied to a single resistive electrode.
Figure 8A:
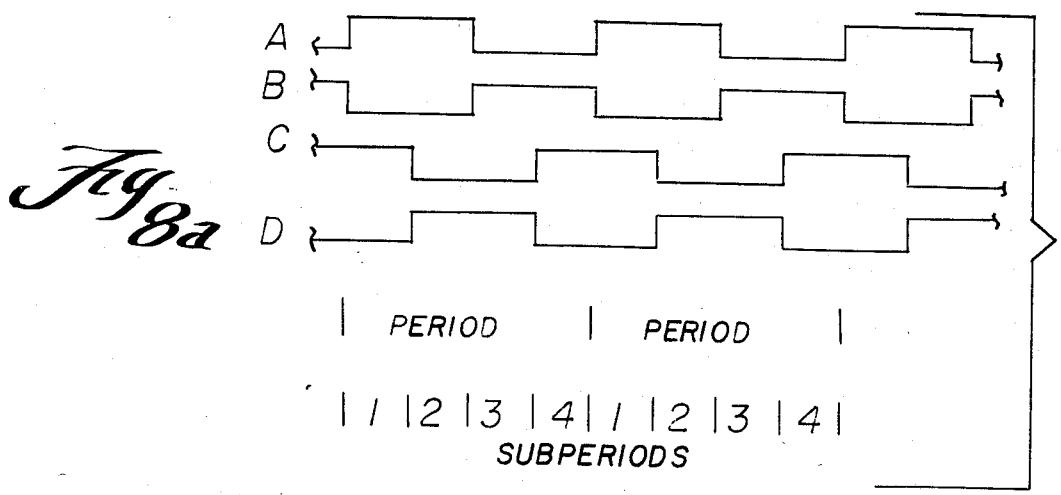
FIG. 8A is a waveform diagram showing the waveforms applied in FIG. 7.

Because techniques and devices are presently available for obtaining very rapid amplitude samples of a waveform, it is also practical to use a synthesized, periodic excitation waveform that permits determination of ball position by means of amplitude ratio measurements. This arrangement is illustrated in FIGS. 7 and 8A. FIG. 7 is a diagrammatic representation showing a continuous resistive source electrode 36 and an inner continuous collector electrode 37, with a ball 38 indicated in dotted lines for capacitively coupling one to the other. FIG. 8A is a plot of the quadrature square waves A, B, C, and D as applied to the uniform resistive source electrode 36. The total period of the waveform is divided into four sub-periods, labelled 1-4 in FIG. 8A.

Assume that the ball is located between excitation points A and C. During sub-period 1 both points A and C are excited by a maximum positive voltage (+V); hence there will be no voltage drop between them and all points on the resistor between A and C will be at the same potential +V. To the extent that the collector electrode input circuit time constant is long with respect to the sub-period, then a signal whose amplitude is proportional to +V will be coupled to collector electrode 37. Similarly, during sub-period 3 a signal proportional to -V will be coupled to the collector electrode 37.

During sub-period 2 excitation point A is at potential +V and excitation point C is at potential -V. Because a uniform resistive electrode joins these two points there will exist along the length of this electrode segment a uniform potential drop from +V to -V. The potential at any point along the electrode will thus be proportional to the fractional displacement of the point from A towards C. In particular, since the electrode is in the form of a circumference of a circle, and the distance along the circumference is proportional to the subtended central angle, then the potential along the electrode is proportional to the corresponding angular displacement. The ball located within this arc of the circle will couple to the collector electrode a potential corresponding to its position. The value of this potential is given by the relationship:

$$v = V\left(1 - \frac{2\theta}{90}\right) \tag{2}$$

An identical but negative relationship holds during sub-period 4. Similar linear relationships hold for the other three quadrants of the inclinometer.

It is clear that by subtracting the measurements made during sub-periods 1 and 3 one obtains a value proportional to 2V. Likewise, subtracting the measurements made during subperiods 2 and 4 yields a value proportional to $$2V\left(1 - \frac{2\theta}{90}\right).$$

The ratio of these two values is the desired linear measure of angle, and is independent of excitation signal amplitude and coupling efficiency.

It should be emphasized that the square wave excitation illustrated in FIG. 8A is only one of a large family of waveforms that could be used to implement the foregoing technique. Any combination of waveforms that periodically generates a linear potential gradient along each segment of the source electrode is satisfactory.

Figure 8B:
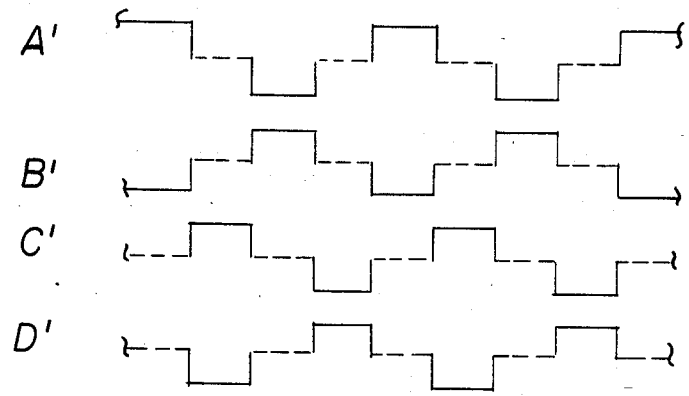
FIG. 8B is a waveform diagram showing an alternate form of waveforms which can be applied.

In the foregoing discussions it is presumed that linear behavior will be obtained over an entire segment. In fact, due to the distributed coupling between the ball and the source electrode, some departure from strict linearity will be observed when the ball is in the vicinity of an excitation point. This effect can be reduced or eliminated by employing a drive waveform that drives adjacent segments at the same gradient. An example of such a waveform is shown in FIG. 8B, where the dashed segments indicate periods during which that particular drive point is left open-circuited. Thus, for example, during subperiod 1 when A' is positive, B' is negative, and C' and D' are open-circuited, a uniform potential gradient will be generated along both halves of the source electrode between drive points A' and B'; and in particular this uniform gradient will exist in the vicinity of drive points C' and D'. By alternately driving and open-circuiting the diametric drive points, the required uniform gradient can be created at each of the several drive points.

The drive waveform shown in FIG. 8B does not preserve the self-calibrating feature of the waveform of FIG. 8A. The two waveforms can be combined in time sequence to obtain self-calibration and uniform gradients in the vicinity of drive points. Clearly a multiplicity of drive points (3 or more) and a variety of drive waveforms can be combined to achieve both these features.

Figure 9:
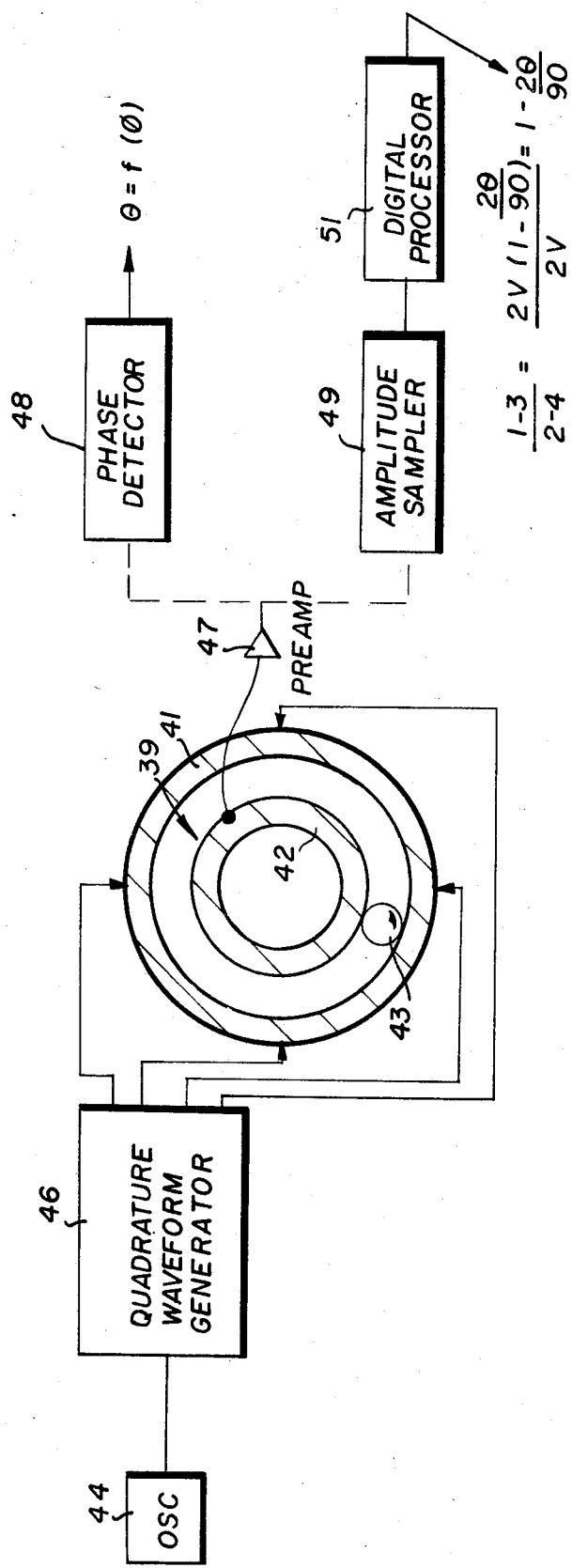
FIG. 9 is a block diagram illustrating typical electronics for applying quadrature signals to a source electrode, and for processing output signals from a collector electrode.

Turning now to FIG. 9, there is illustrated in block diagram form suitable electronic circuitry for use with the inclinometer of the present invention. In accordance with the preferred embodiment of the invention a circular cross section toroidal race 39 is provided with an outer source electrode 41 and an inner collector electrode 42, with a spherical ball 43 disposed in the toroidal race 39. An oscillator 44 is provided driving a quadrature waveform generator 46 having quadrature outputs applied along perpendicular diameters to the source electrode 41. The signal picked up from the collector electrode 42 is applied to a preamp 47. From the preamp 47 there are two possibilities as illustrated by the dashed lines in FIG. 9. First of all, if a phase detector 48 is utilized, the output of preamp 47 is fed directly into the phase detector 48 and the output of the phase detector is a direct indication of the angular position of the ball 43.

Figure 8B:
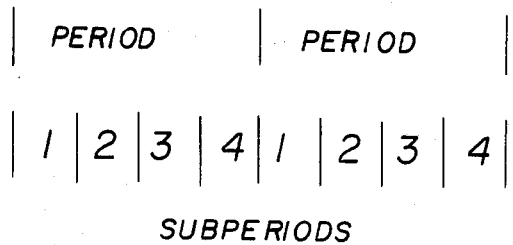

If, instead, amplitude sampling techniques are utilized as shown and discussed in connection with FIG. 8, then the output of preamp 47 is applied to an amplitude sampler 49, with the output amplitude sample 49 being applied to a digital processor 51 to perform the required calculation, as indicated in FIG. 9.

Figure 10:
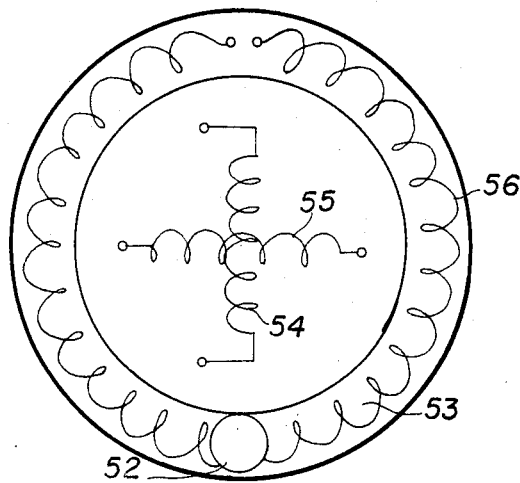
FIG. 10 illustrates another embodiment of the invention in which source coils establish a magnetic field, with collector coils sensing a perturbation in the field in accordance with ball position.

A device can also be constructed using magnetic instead of electric fields to sense inclination, and an example of such a device is illustrated diagrammatically in FIG. 10. A ferromagnetic or diamagnetic ball 52 is disposed in a toroidal race 53 as before. A perpendicular pair of coils 54 and 55 are illustrated as being situated within the race on its axis. Alternatively, they could be disposed surrounding the race. In either event, the coils generate a rotating magnetic field in the plane of the race, analogous to the rotating electric field described before. A pair of axial coils 56 (only one of which is shown in FIG. 10) are disposed axially on either side of the race and are connected in opposition to sense the anomaly generated by the presence of the ball 52. As in the electric field version, the phase of the resultant signal uniquely determines the sensor's inclination.

Figure 11:
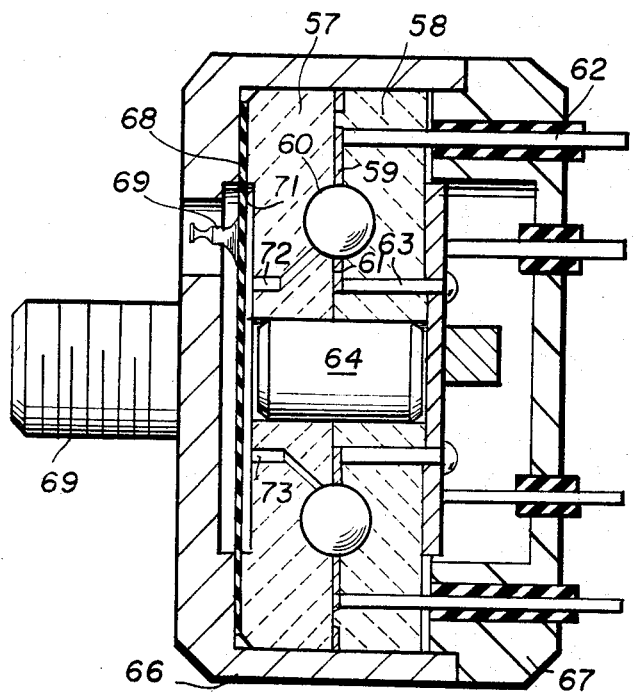
FIG. 11 is a cross sectional elevation of one embodiment of an inclinometer in accordance with the present invention.

Turning now to FIG. 11, there is shown mechanical details of an inclinometer constructed in accordance with the principles of this invention. In accordance with the cross sectional view of a preferred embodiment as shown in FIG. 11, the basic toroidal race of circular cross section is formed by joining two race halves 57 and 58. In accordance with the preferred embodiment of the invention, the race halves 57 and 58 are formed of ceramic material, such as alumina. A ball is, of course, placed in the race prior to assembling the two halves. In accordance with the preferred embodiment of the invention the ball is formed of vitreous carbon. Prior to joining the two race halves 57 and 58 a source electrode 59 is deposited on the race half 58 as well as a collector electrode 61. A plurality of lead out wires 62 extend from the source electrode 59, and four of these lead out electrodes 62 are provided for application of quadrature signals to the source electrode 59. A plurality of electrodes (two in accordance with this embodiment) 63 extend from the collector electrode 61. As shown in FIG. 11, an alignment pin 64 is useful in assembling the two race halves 57 and 58. A housing consisting of housing halves 66 and 67 surrounds the entire assembly and the electrodes 62 and 63 extend through the casing half 67 and are insulated therefrom. A mounting stud 69 can be provided extending from the casing half 66 for mounting the sensor assembly.

Just inside the casing half 66 a diaphragm 68 is disposed having a nipple 69. A reservoir 71 inside the race half 57 communicates with this diaphragm 68 and channels 72 and 73 shown in FIG. 11 extend from the reservoir 71 to communicate with the race generally indicated by reference numeral 60. The purpose of this arrangement is to permit filling of the race 60 with a damping fluid after assembly of the two race halves. The purpose of the diaphragm 68 is to allow for expansion and contraction of this fluid. After filling of the race and diaphragm through the nipple 69, the nipple 69 is pinched off as shown in the figure to seal the damping fluid therein.

An inclinometer constructed in accordance with FIG. 11 functions under severe environmental conditions to provide an indication of the gravity vector. By choosing the material defining the toroidal race as alumina, and choosing the material for the ball disposed within the race as vitreous carbon, relative temperature insensitivity is achieved. That is, the temperature coefficients of expansion of alumina and vitreous carbon are relatively similar, so that proper clearances are maintained and functioning of the inclinometer is maintained despite wide variations of temperature. Likewise, the inclinometer in accordance with the present invention is relatively insensitive to vibrations. Since coupling of the electrodes through the ball in the race is achieved by capacitance coupling, vibration of the ball within the race does not affect any ohmic contacts or the like.

In many applications the subject inclinometer will be employed in groups of three, disposed on mutually orthogonal faces of a cube, for the purpose of uniquely determining the direction of the gravity vector in a three dimensional coordinate system fixed to the cube. Also, in many instances the subject inclinometer can be employed in groups of two for those situations in which the singular conditions in which the need for sensing about the third axis is highly unlikely or not apt to occur. Additionally, this same information can be used to determine various uniquely defined sets of angles such as the "driller's angles" of "inclination" and "gravitational tool face angle". Although these transformations can be made via a variety of techniques, a specific example of each is given here.

Figure 12:
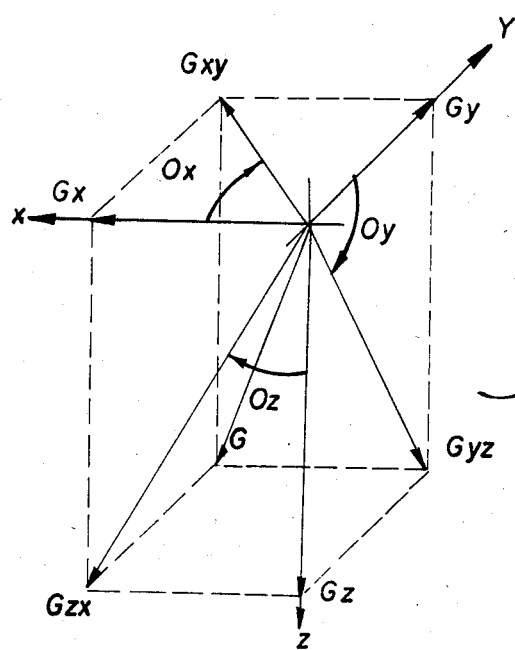
FIG. 12 is a plot showing a three axis coordinate system wherein three inclinometers in accordance with the present invention can be utilized.

Consider the right-handed coordinate system shown in FIG. 12. An inclinometer is placed in each coordinate plane of this system (i.e., in the XY, the YZ, and the ZX planes) and is configured to measure the angle of the projection of gravity into that plane. The origin and sense of each angle measurement are as shown. Except for those singular conditions where the gravity vector coincides with one of the coordinate vectors, it will have a projection in each of the three principal planes, and thereby produce a valid angle measurement in each of the three inclinometers. Two problems exist, however. First, in those singular cases where the gravity vector is perpendicular to one of the inclinometers, its angular measurment data will be meaningless (the position of the ball within the inclinometer is arbitrary under these conditions) but an indication of this singular condition is not inherent in the output of this one inclinometer. Second, when a singular condition does not exist, the angle measurements provided by all three inclinometers constitute an overdetermination of the gravity vector—only a subset of two is needed for a unique determination. For both these conditions a means must be provided for choosing the two inclinometers to use. A simple criterion is used for making this selection. Data from the inclinometer most nearly perpendicular to the gravity vector is rejected, and data from the remaining two are used to determine the gravity vector. It is clear that this criterion applies in the singular cases since an inclinometer exactly perpendicular to the gravity vector cannot provide any useful information about the gravity vector. Similarly, within an inclinometer whose plane is nearly perpendicular to the gravity vector, the forces acting to move the ball to the lowest point in the toroid are very small—being proportional to the sine of the angle between the perpendicular to the inclinometer plane and the gravity vector. When these operative forces are small, the ball motion can be strongly influenced by any residual friction or anomalies in the toroid, thereby adversely affecting the accuracy and validity of the unit's output. Therefore, it is prudent to reject the data from an inclinometer that is not only exactly perpendicular to the gravity vector but also when it is the closest one to perpendicular to the gravity vector.

The two inclinometers from which data should be used can be selected as follows. Evaluate the angle reported by each inclinometer between the projection of gravity into the plane of the inclinometer and the four coordinate axes that also lie in the plane of that inclinometer. Each inclinometer provides four measurements for a total of twelve for the triad. It can be shown that of these 12 values (two per coordinate axes) one axis, and only one axis, can have the absolute value of both values less than 45°. This axis is the intersection of the planes of the two inclinometers that should be used. For example, if the angles to the +Z axis are −17° and +35° then data should be taken from the YZ and ZX inclinometers, and the data from the XY inclinometer should be rejected.

There do exist singular conditions where two axes will each report one angle of exactly 45° and one angle less than 45°. In this case the two inclinometers associated with either of the two axes can be used. A further singular condition exists wherein three axes will each report both angles to be exactly 45°. In this case any convenient pair of inclinometers can be used.

Once the two inclinometers to be used have been chosen, the components of gravity are computed as follows. Define the angle measured clockwise (positive right hand rotation) from the +X axis in the XY plane as $\theta x$. Similarly, $\theta y$ is the angle from the +Y axis in the YZ plane and $\theta z$ is the angle from the +Z axis in the ZX plane. (See FIG. 12). Next, compute the three components of the unit gravity vector via the following formulas: If the XY and YZ inclinometers are used $$Gx = K \cos \theta y \cot \theta x$$

$$Gy = K \cos \theta y \tag{3}$$

$$Gz = K \sin \theta y$$

$$K = [1 + \cos^2 \theta y \cot^2 \theta x]^{-\frac{1}{2}} \tag{4}$$

If the YZ and ZX inclinometers are used $$Gx = K \sin \theta z$$

$$Gy = K \cos \theta z \cot \theta y \tag{5}$$

$$Gz = K \cos \theta z$$

$$K = [1 + \cos^2 \theta z \cot^2 \theta y]^{-\frac{1}{2}} \tag{6}$$

If the ZX and XY inclinometers are used $$Gx = K \cos \theta x$$

$$Gy = K \sin \theta x \tag{7}$$

$$Gz = K \cos \theta x \cot \theta z$$

$$K = [1 + \cos^2 \theta x \cot^2 \theta z]^{-\frac{1}{2}} \tag{8}$$

A gravity tool face angle as used in drilling applications is the angle measured clockwise (rotatin of X into Y in a right-handed system) in the XY plane of the +Y axis from the negative of the projection of the gravity vector into this plane. This angle can be measured in two ways. For inclinations other than zero, the XY inclinometer measures this angle directly and it is given by $$GTF = (270° - \theta x)/\text{modulo } 360° \tag{9}$$

Gravity tool face angle can also be determined from the components of gravity as measured by the selected pair of inclinometers. In this case the angle is given by $$GTF = \tan^{-1} \frac{Gx}{Gy} \tag{10}$$

A warning flag is usually associated with the value of gravity tool face angle whenever the inclination angle is less than some predetermined value (typically 5°). This serves as a reminder that the projection of the gravity vector into the XY plane is small and therefore the measurement of GTF could contain significant errors.

The inclination angle as used in drilling applications is the angle between the gravity vector and the +Z coordinate vector. In terms of the components of gravity it is given by $$I = \tan^{-1} \frac{\sqrt{Gx^2 + Gy^2}}{Gz} \tag{11}$$

Turning now to FIG. 13, there is shown an illustration of the manner in which the inclinometer of the present invention can be incorporated in borehole sensors for drilling applications. The sensor comprises a casing 76 containing all of the sensing devices and electronics which typically mounts behind the drilling head in a non-magnetic drill collar. Disposed in the sensor assembly at one end of the housing is typically a three axis magnetometer 77. Processing electronics are generally disposed in the center portion of the sensor and are generally indicated by reference numeral 78. At the other end of the housing 76 are disposed three single axis inclinometers 79, 80 and 81 for sensing inclination of the sensor along the three coordinate axes as discussed in connection with FIG. 12.

Although the invention has been described in connection with various preferred embodiments thereof, it should be clear that it is not limited thereto. Many variations and modifications to these preferred embodiments are possible without departing from the true spririt and scope of the invention.

What is claimed is:

1. An inclinometer comprising means defining a continuous, closed toroidal race, a spherical ball disposed in said race for free movement therein under the influence of gravity, said toroidal race and said ball configured for single point contact therebetween, means for establishing an electromagnetic field along said race with said ball causing a unique perturbation in said electromagnetic field indicative of the position of said ball, and means for sensing said perturbation and hence said ball position to sense the direction of a gravity vector, and wherein said means for establishing an electromagnetic field comprises a source electrode adjacent one side of said toroidal race, means coupling a signal to said source electrode for establishing an electric field, a collector electrode adjacent an opposite side of said toroidal race, with said ball functioning to capacitively couple signals on said source electrode to said collector electrode, and including means for detecting a signal on said collector electrode whereby the signals coupled to said collector electrode are indicative of the position of said ball in said race, which is in turn indicative of the direction of the gravity vector.

2. An inclinometer in accordance with claim 1 wherein said means for establishing an electromagnetic field comprises coil means for establishing a rotating magnetic field, and wherein said means for sensing said perturbation comprises additional coil means adjacent said race.

3. An inclinometer in accordance with claim 1 wherein said toroidal race is of circular cross section.

4. An inclinometer in accordance with claim 1 wherein said source electrode has a shape such that the coupling capacitance between said source electrode and said collector electrode caused by said ball varies as a function of position around said race whereby the amplitude of the coupled signal varies with ball position in said race.

5. An inclinometer in accordance with claim 1 wherein said source electrode comprises a plurality of individual electrodes of predetermined shape and wherein said means coupling a signal to said source electrode comprises means coupling a plurality of individual signals, one for each of said plurality of individual electrodes, to each individual electrode, respectively, said individual signals being each distinct from each other, and wherein said predetermined shape of said individual electrodes is such that the capacitive coupling of said plurality of signals to said ball varies as a function of ball position in said race.

6. An inclinometer in accordance with claim 1 wherein said source electrode comprises a continuous resistive electrode adjacent one of the inner and outer circumference of said race and wherein said collector electrode comprises a continuous electrode adjacent the other of said inner and outer circumference.

7. An inclinometer in accordance with claim 6 a plurality of signals are coupled to spaced apart excitation points on said source electrode, with said signals and excitation points being selected to provide a unique summation of said signals at each point on said source electrode's circumference, whereby the potential distribution along the length of the resistive source electrode provides a spatial variation in a characteristic of the signal coupled to said collector electrode in dependence upon position of said ball in said race.

8. An inclinometer in accordance with claim 5 wherein said source electrode comprises four individual electrodes of predetermined shape and wherein said plurality of individual signals comprises two periodic signals in time quadrature applied to perpendicular diameters of said source electrodes.

9. An inclinometer in accordance with claim 8 wherein said two periodic signals are sinusoidal.

10. An inclinometer in accordance with claim 6 wherein a plurality of signals are coupled to spaced apart excitation points on said source electrode, said signals comprising two periodic signals in time quadrature applied to perpendicular diameters of said source electrodes.

11. An inclinometer in accordance with claim 10 wherein said two periodic signals in time quadrature are sinusoids, whereby the waveform of a signal capacitively coupled to said collector electrode is sinusoidal and with a phase that varies in accordance with ball position in said race according to $$\tan \phi = \frac{-\theta}{90 - \theta}$$

where $\phi$ is sinusoidal phase angle and $\theta$ is ball position in degrees.

12. An inclinometer in accordance with claim 10 wherein said two periodic signals in time quadrature are triangle waves, whereby the waveform of a signal capacitively coupled to said collector electrode has time of zero crossing linearly related to ball position in said race and including phase detector means coupled to said collector electrode for measuring phase of said signal on said collector electrode as an indication of ball position within said race.

13. An inclinometer in accordance with claim 10 wherein said two periodic signals in time quadrature are generated via linear operations performed on a triangle wave and the appropriate inverse operation is performed on output signals from said collector electrode.

14. An inclinometer in accordance with claim 7 wherein said plurality of signals are quadrature square waves as shown in FIG. 8A coupled to said source electrode as shown in FIG. 7, and including an amplitude sampler for sampling amplitude of signals on said collector electrode during four sub-periods of the period of said quadrature square waves, and also including a processor for determining the ratio between the difference between the signals on the collector electrode during sub-periods 1 and 3 and the difference between the signals on the collector electrode during sub-periods 2 and 4, said ratio being a linear measure of ball position within said race.

15. An inclinometer in accordance with claim 7 wherein said plurality of signals are quadrature three-state waveforms as shown in FIG. 8B coupled to said source electrode as shown in FIG. 7, which waveforms permit the reduction of non-linearity in the vicinity of the excitation points, and including an amplitude sample for sampling amplitude of signals on said collector electrode during four sub-periods of the period of said quadrature three-state waves, and also including a processor for determining the difference between the signals on the collector electrode during sub-periods 1 and 3 and the difference between the signals on the collector electrode during sub-periods 2 and 4, each difference taken alone providing an ambiguous linear measure of the ball position within said race, but the two differences taken together providing an unambiguous linear measure of the ball position within said race.

16. An inclinometer in accordance with claim 7 wherein said plurality of signals are combinations of quadrature square waves as shown in FIG. 8A and quadrature 3-state waves as shown in FIG. 8B, combined for the purpose of obtaining both self-calibration and reduction of non-linearity in the vicinity of the drive points, coupled to said source electrode as shown in FIG. 7, and including an amplitude sampler for sampling amplitude of signals on said collector electrode during the several subperiods of the period of said combined waveform, and also including a digital processor for performing those mathematical operations on the several amplitude measurements required to determine from them the ball position within said race.

17. A multiple axis inclinometer comprising at least first and second individual inclinometers mounted such that their axes are not colinear for sensing inclination about respective at least two non-colinear axes, each of said inclinometers comprising means defining a continuous, closed toroidal race, a spherical ball disposed in said race for free movement therein under the influence of gravity, said toroidal race and said ball configured for single point contact therebetween, source electrode means adjacent one side of said toroidal race, means for generating and coupling a periodically bearing signal to said source electrode means for establishing an electric field therealong, collector electrode means adjacent an opposite side of said toroid, with said ball functioning to capacitively couple signals on said source electrode means to said collector electrode means, and including means for detecting signals on said collector electrode means, with the signals coupled to said collector electrode means being indicative of the position of said ball in said race, which is in turn indicative of the direction of the gravity vector.

18. A multiple axis inclinometer in accordance with claim 17 wherein said source electrode means comprises a continuous resistive electrode adjacent one of the inner and outer circumference of said race and wherein said collector electrode means comprises a continuous electrode adjacent the other of said inner and outer circumference.

19. A multiple axis inclinometer in accordance with claim 18 wherein a plurality of signals are coupled to spaced apart excitation points on said continuous resistive electrode, with said signals and excitation points being selected to provide a unique summation of said signals at each point on said continuous resistive electrode, whereby the potential distribution along the length of the resistive source electrode provides a spatial variation in amplitude of signal coupled to said collector electrode means in dependence upon position of said ball in said race.

20. A multiple axis inclinometer in accordance with claim 18 wherein a plurality of signals are coupled to spaced apart excitation points on said source electrode means, said signals and excitation points being selected such that the phase of signals coupled by said ball to said collector electrode means varies linearly with ball position within said race.

21. A multiple axis inclinometer in accordance with claim 20 wherein said plurality of signals are two periodic triangle waves in time quadrature applied to perpendicular diameters, whereby the waveform of a signal capacitively coupled to said collector electrode has zero crossings linearly related to ball position in said race and including phase detector means coupled to said collector electrode for measuring phase of said signal on said collector electrode as an indication of ball position within said race.

22. An inclinometer in accordance with claim 20 wherein said plurality of signals are two periodic signals in time quadrature generated via linear operations performed on a triangle wave, and the appropriate inverse operation is performed on output signals from said collector electrode.

23. An inclinometer in accordance with claim 20 wherein said plurality of signals are quadrature square waves as shown in FIG. 8A coupled to said source electrode means as shown in FIG. 7, and including an amplitude sampler for sampling amplitude of signals on said collector electrode means during our sub-periods of the period of said quadrature square waves, and also including a digital processor for determining the ratio between the difference between the signals on the collector electrode during sub-periods 1 and 3 and the difference between the signals on the collector electrode during sub-periods 2 and 4, said ratio being a linear measure of ball position within said race.

24. An inclinometer in accordance with claim 20 wherein said plurality of signals are quadrature three-state waveforms as shown in FIG. 8B coupled to said source electrode as shown in FIG. 7, which waveforms permit the reduction of non-linearity in the vicinity of the excitation points, and including an amplitude sample for sampling amplitude of signals on said collector electrode during four sub-periods of the period of said quadrature three-state waves, and also including a processor for determining the difference between the signals on the collector electrode during sub-periods 1 and 3 and the difference between the signals on the collector electrode during sub-periods 2 and 4, each difference taken alone providing an ambiguous linear measure of the ball position within said race, but the two differences taken together providing an unambiguous linear measure of the ball position within said race.

25. An inclinometer in accordance with claim 20 wherein said plurality of signals are combinations of quadrature square waves as shown in FIG. 8A and quadrature 3-state waves as shown in FIG. 8B combined for the purpose of obtaining both self-calibration and reduction of non-linearity in the vicinity of the drive points, coupled to said source electrode as shown in FIG. 7, and including an amplitude sampler for sampling amplitude of signals on said collector electrode during the several subperiods of the period of said combined waveform, and also including a digital processor for performing those mathematical operations on the several amplitude measurements required to determined from them the ball position within said race.

26. A multiple axis inclinometer in accordance with claim 17 comprising first, second and third individual inclinometers mounted in a non-coplanar relationship for sensing inclination about three non-coplanar axes, nominally the orthogonal X, Y, and Z axes.

* * * * *